May 24, 1938.    P. J. ERNST    2,118,760
ROLLER BEARING
Filed July 3, 1936    3 Sheets-Sheet 1
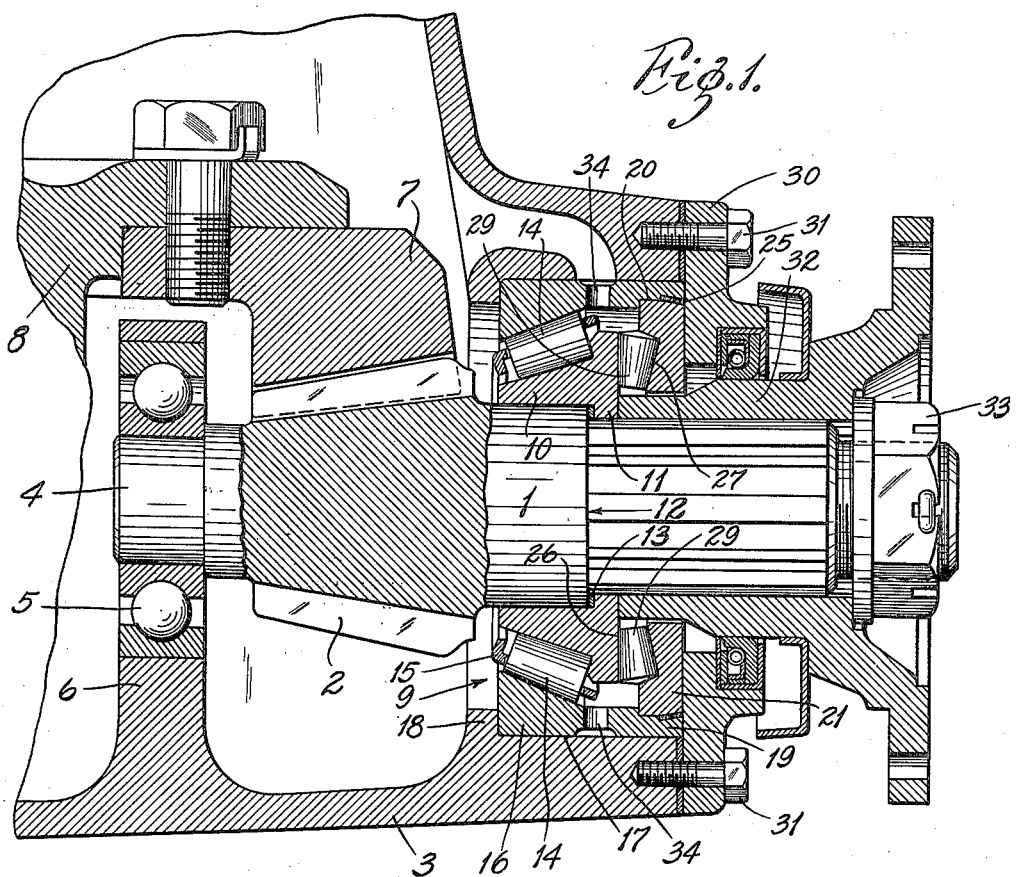
Fig. 1.
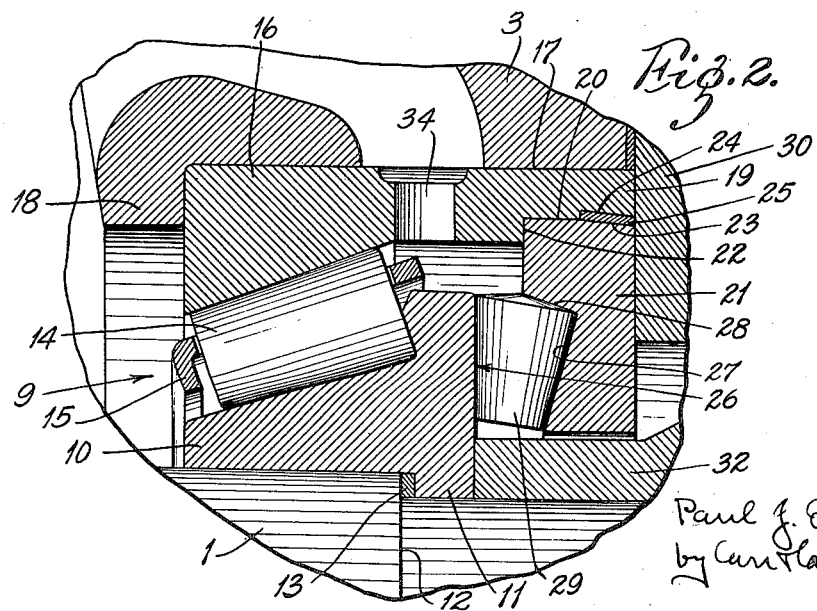
Fig. 2.
INVENTOR:
Paul J. Ernst,
by Curtlan & Gravely,
HIS ATTORNEYS.

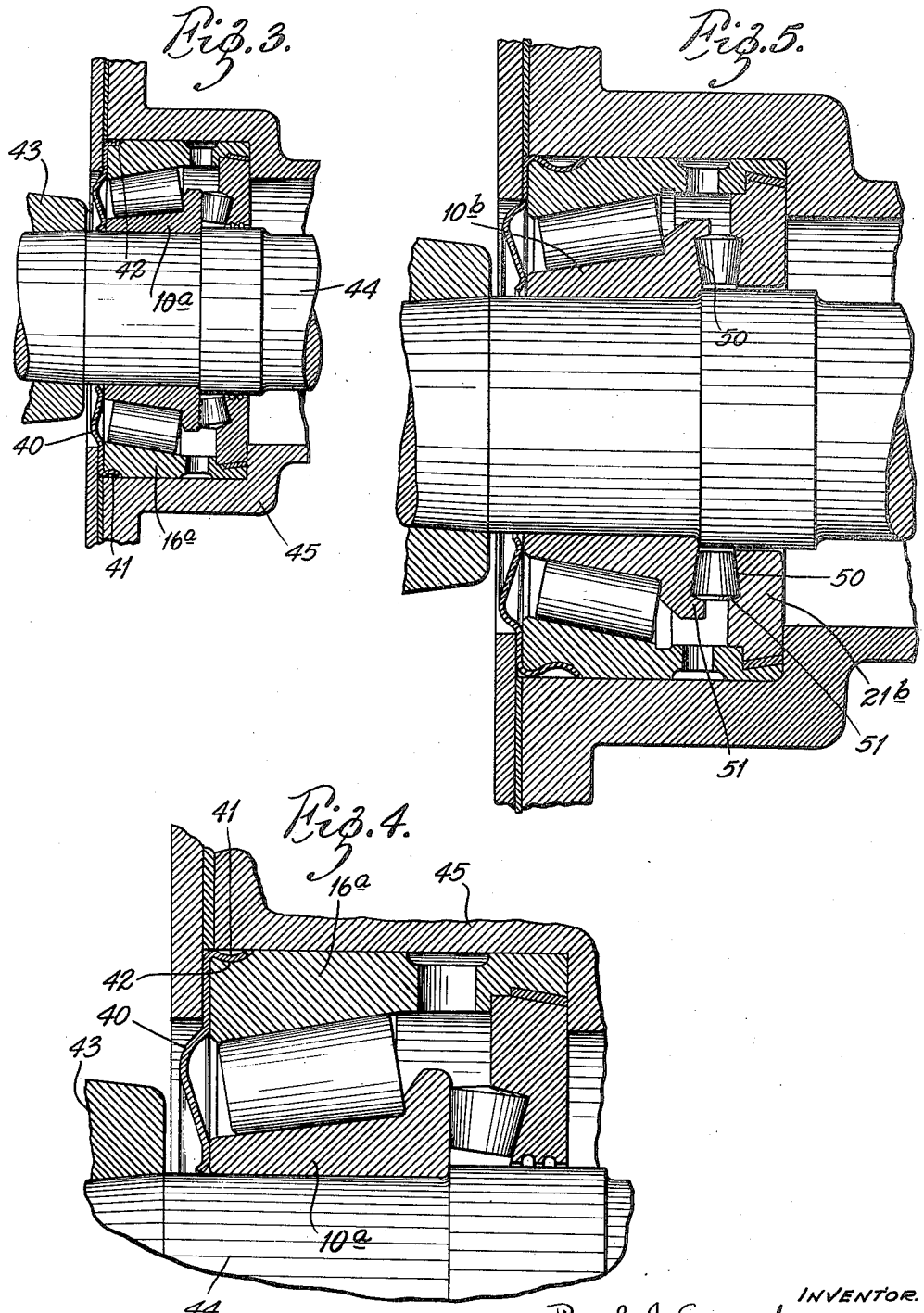

May 24, 1938. P. J. ERNST 2,118,760
ROLLER BEARING
Filed July 3, 1936 3 Sheets-Sheet 3

Fig. 6.

INVENTOR
Paul J. Ernst,
by Carl Plan & Gravely,
HIS ATTORNEYS

Patented May 24, 1938

2,118,760

UNITED STATES PATENT OFFICE 2,118,760

ROLLER BEARING

Paul J. Ernst, Canton, Ohio, assignor to The Timken Roller Bearing Company, Canton, Ohio, a corporation of Ohio Application July 3, 1936, Serial No. 88,711

2 Claims. (Cl. 308—214)

My invention relates to roller bearings, particularly to taper roller bearings that are required to carry a radial load and to withstand end thrust in both directions. The invention has for its principal object a bearing of this type that is compact in construction and that is self-contained. The bearing is particularly adapted for use in automobile pinion shaft mountings and in the wheel bearings of automobile drive axles of the fixed hub or semi-floating type.

The invention consists principally in a taper roller bearing including a series of taper rollers mounted between cup and cone to form a radial type bearing, whose cup is provided with a sleeve portion projecting beyond the large end of the cone, an annular thrust plate mounted in said sleeve portion and a series of taper rollers arranged to form a thrust bearing between said thrust plate and the end of said bearing cone. The invention further consists in the roller bearing and in the parts and combinations and arrangements of parts hereinafter described and claimed.

In the accompanying drawings,

Fig. 1 is a longitudinal sectional view of a pinion shaft mounted in a roller bearing embodying my invention, Fig. 2 is an enlarged sectional view of the bearing illustrated in Fig. 1, Fig. 3 is a partial sectional view showing such a bearing mounted at the wheel end of an automobile drive axle of the fixed hub or semi-floating type and provided with a seal for the end of the bearing, Fig. 4 is an enlarged sectional view of the bearing shown in Fig. 3, Fig. 5 is a longitudinal sectional view similar to Fig. 3 showing a modified form of bearing; and Fig. 6 is a sectional view of a drive axle wheel mounting construction including my bearing.

In Fig. 1 is illustrated a pinion shaft mounting of the straddle type, a pinion shaft 1 with a pinion 2 thereon projecting into a portion of an axle housing 3. The free end 4 of said pinion shaft 1 is mounted in a radial type ball bearing 5 which is supported on a seat 6 provided therefor in the housing 3. Portions of the ring gear 7 that mesh with said pinion and of the differential spider 8 to which said ring gear is secured are shown in the drawings.

On the other side of the pinion 2 from said radial ball bearing 5 is a duplex taper roller bearing 9 embodying my invention. The cone 10 or inner bearing member is seated on said pinion shaft 1 with its small end directed towards said pinion 2. An annular flange 11 projecting radially inward at the large end of said cone overlaps a shoulder 12 on said shaft and shims 13 are inserted between said shoulder and said flange to properly position said cone 10. Seated on the conical raceway of said cone is a series of conical rollers 14 that are held in a cage 15 and the cup 16 or outer bearing member for said rollers is seated in a bore 17 in said housing against an annular shoulder 18 therein. The radial load is carried by said series of conical rollers 14 and the thrust in one direction is taken up between said rollers 14 and the bearing cup 16.

Projecting from said bearing cup 16 beyond the large end of said bearing cone 10 is a cylindrical sleeve portion 19 in whose outer end is a countersunk bore 20 in which is mounted an annular thrust plate 21, the inner face of said thrust plate abutting against an annular shoulder 22 at the inner end of said countersunk bore 20. The opening in said thrust plate 21 is of larger diameter than the bore of said cone 10. The outer peripheral portion 23 of said thrust plate is preferably beveled off and the end 24 of said bore is correspondingly conical, thereby forming a conical annular space in which is mounted a ring of soft metal 25 to hold the thrust plate 21 in position. The end face 26 of the cone is flat, being disposed at right angles to the pinion shaft axis and the opposed face of the thrust plate 21 is provided with a conical raceway portion 27 and with a conical thrust shoulder 28 or raceway portion. A series of taper rollers 29 are interposed between said end face of said cone and said thrust plate.

An annular end cap 30 is secured to the end of the housing as by cap screws 31 and abuts against the end of the bearing sleeve 19 and thrust plate 21 to hold the bearing in position. Projecting into the housing is a sleeve 32 which abuts against the flange 11 of said bearing cone 10 and which is held on said shaft, as by a nut 33. The sleeve 19 may be provided with openings 34 adjacent to the thrust plate 21 to permit lubricant to enter the bearing.

In Fig. 3 is illustrated a slightly different form of bearing wherein the cage is dispensed with and the bearing is made self-contained by means of a closure ring 40 which overlaps the ends of the cup 16a and cone 10a and which is provided with a peripheral flange 41 of convex curvature on its inner face which is seated in a correspondingly concave groove 42 formed in the outer periphery of the bearing cup 16a. In said Fig. 3 is illustrated the wheel bearing portion of an automobile axle of the fixed hub or semi-floating type, a portion of the wheel 43 being indicated on the end portion of the axle and the bearing being interposed between an axle 44 and its housing 45.

In Fig. 5 is illustrated a slightly different form of bearing, wherein the end face of the cone 10b and the opposed inner face of the thrust plate 21b are both provided with conical raceway portions 50 and with thrust ribs 51 overlapping the ends of the rollers. In this type of bearing, the thrust rollers are disposed with their axes at right angles to the axis of the radial portion of the bearing.

In Fig. 6 is shown the end portion of an automobile drive axle of the three-quarter floating type, wherein the driving axle section 60 has a flanged end 61 that is secured to a radial face 62 of a wheel hub member 63 as by bolts 64 and nuts 65. The cup 16 of the duplex taper roller bearing is mounted in said wheel member with the end of the sleeve portion 19 and a portion of the thrust plate 21 seated against and backed by an outwardly facing shoulder 66 in said hub member. The cone 10a is mounted on a hollow axle member 67 through which the drive axle section 60 extends, the large end of the cone abutting against a spacer sleeve 68 on said hollow axle 67 and the small end of the cone being held by means of a nut 69 mounted on the threaded end of the hollow axle 67. An annular oil seal 70 is mounted in the inner end of the wheel hub member 63 back of the thrust plate 21 and fits around the spacer sleeve 68. The flange 61 of the drive axle section has an inwardly projecting sleeve portion 71 that abuts against the bearing cup.

The duplex taper roller bearing hereinbefore described is compact in construction, it is self-contained and it carries radial load as well as withstanding end thrust in both directions. Obviously the bearing may be used in many combinations besides those illustrated and numerous changes may be made without departing from the invention.

What I claim is:

1. The combination of an axle having an outwardly facing shoulder, a housing therefor having an outwardly facing internal shoulder and a duplex taper roller bearing interposed between said axle and said housing, said duplex bearing comprising a bearing cone on said axle abutting at its large end against said shoulder, conical rollers between said cup and said cone, said cup having a sleeve portion projecting beyond the large end of said cone and abutting against said internal shoulder, an annular thrust plate mounted in the end of said sleeve portion, taper thrust rollers interposed between said thrust plate and the end face of said cone, said annular thrust plate constituting a sealing ring for said axle.

2. The combination of an axle having an outwardly facing shoulder, a housing therefor having an outwardly facing internal shoulder and a duplex taper roller bearing interposed between said axle and said housing, said duplex bearing comprising a bearing cone on said axle abutting at its large end against said shoulder, conical rollers between said cup and said cone, said cup having a sleeve portion projecting beyond the large end of said cone and abutting against said internal shoulder, an annular thrust plate mounted in the end of said sleeve portion, taper thrust rollers interposed between said thrust plate and the end face of said cone, and a sealing ring secured to the outer end of said cup and overlapping the small end of said cone.

PAUL J. ERNST.